J. M. BOYLE & F. REICHMANN.
MOTION TRANSLATING DEVICE.
APPLICATION FILED JAN. 9, 1914.
1,277,371.
Patented Sept. 3, 1918.
2 SHEETS—SHEET 1.
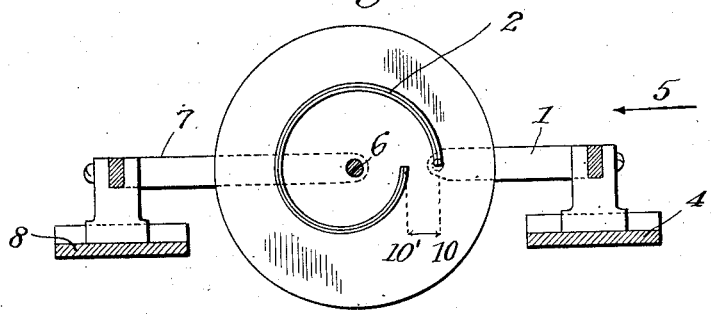
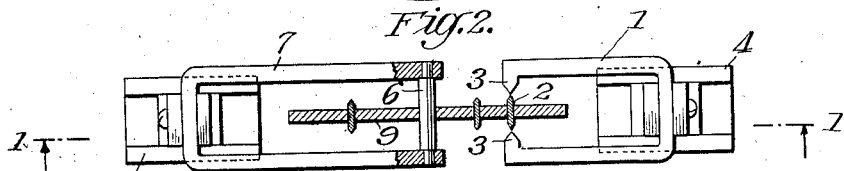
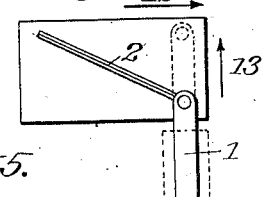
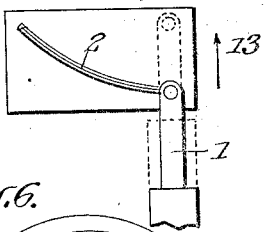
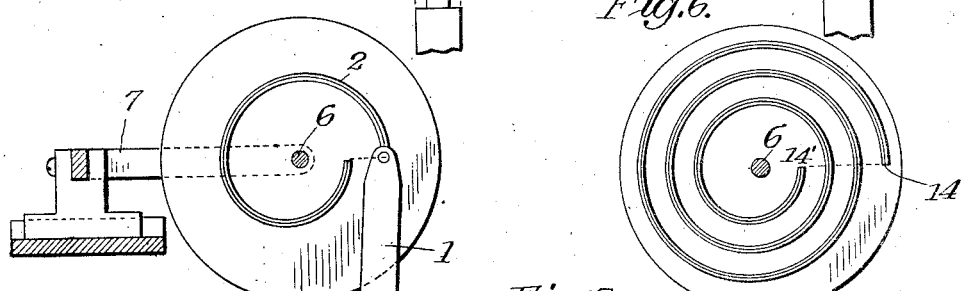
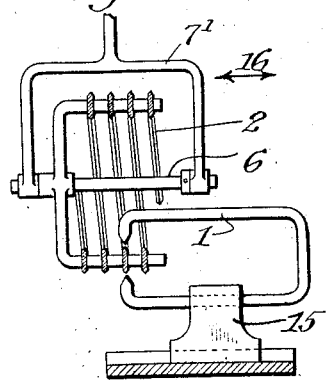
WITNESSES
INVENTOR
James M. Boyle
Fritz Reichmann
Townsend & Decker
ATTORNEYS

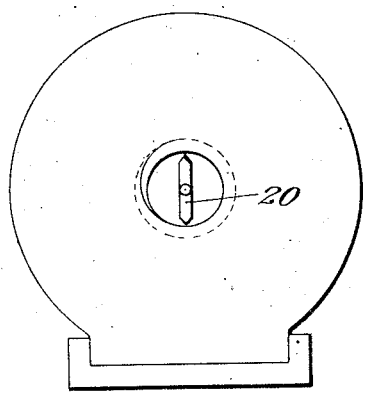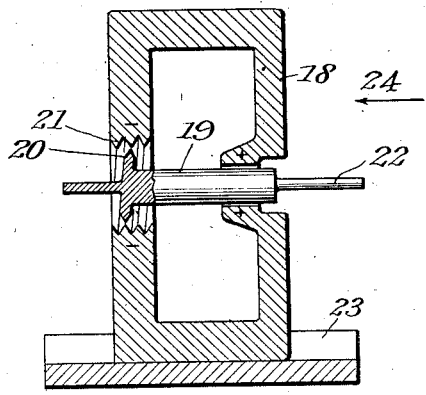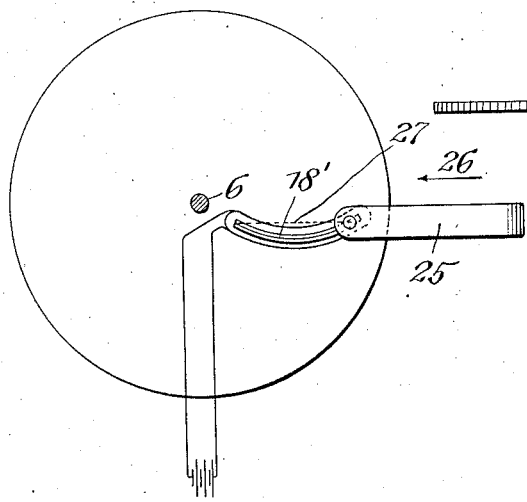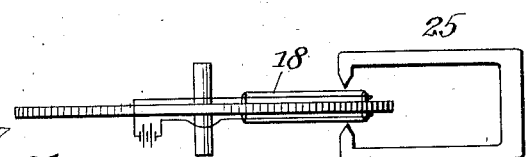

UNITED STATES PATENT OFFICE.

JAMES M. BOYLE AND FRITZ REICHMANN, OF NEW YORK, N. Y.

MOTION-TRANSLATING DEVICE.

1,277,371.  Specification of Letters Patent.  Patented Sept. 3, 1918.

Application filed January 9, 1914. Serial No. 811,147.

*To all whom it may concern:*

Be it known that we, JAMES M. BOYLE and FRITZ REICHMANN, citizens of the United States, and residents of New York, in the county of New York and State of New York, have invented certain new and useful Improvements in Motion-Translating Devices, of which the following is a specification.

Our invention consists of an apparatus in the nature of a mechanical movement or motion translating device whereby the desired change in rate, or direction, or modification of movement is effected without actual mechanical contact or connection such as is required in the case of devices intended for the same purpose and which are purely mechanical, as for instance levers, inclined planes, worms and screws, cams, gears, racks and pinions, and similar devices for translating or transmitting a movement of one part or element into movement of a definite or predetermined rate or form or in a different direction in another part or element.

According to our invention magnetism is substituted for mechanical contact by employing as the motion modifying portion of the apparatus two magnetic and mutually magnetized members movable with relation to one another by magnetic action and also mechanically mounted so as to permit a movement of said members with relation to one another in a direction tending to alter the magnetic reluctance by the mechanical action of the part whose motion is to be translated, said members describing throughout their range of motion intersecting paths whose point of intersection changes progressively in space while the pole face relation of said members remains the same throughout the range of movement at all stages thereof, so that when either member is moved motion of the other will ensue, due to the mutually magnetic action, until the members assume a new position of minimum magnetic reluctance between them.

The invention may be carried out in very many forms suitable for translating or transforming motion of one part, mechanically produced, into motion of a different rate, time or direction in another part. Some of the forms of apparatus suitable for carrying out our invention are illustrated in the accompanying drawings, wherein one of the magnetic elements is shown as lineally extended in a direction which may be generally described as inclined to the direction of the motion of that element of the apparatus that is caused to move by the device whose motion is to be translated.

Figure 1 is a side elevation partially in section of a device embodying our invention.

Fig. 2 is a plan of the same.

Fig. 3 shows the principle of our invention by illustrating one of the magnetic elements as lineally extended in a substantially straight line and by showing how, in such case, rectilinear motion in one direction may be converted into motion at right angles thereto.

Fig. 4 illustrates the principle of the invention by showing the lineally extended member as extended in a curvilinear direction or in a direction which is constantly changing, so as to cause a change in the rate of movement of one part produced by uniform movement of another part.

Fig. 5 shows a form of the invention wherein a rocking movement may be converted into a rotary or rocking movement.

Fig. 6 illustrates one of the ways in which the magnetic element which is lineally extended may be constructed to produce several revolutions of a shaft through a limited movement of the part whose motion is to be converted.

Fig. 7 shows a construction for the same purpose as Fig. 6.

Fig. 8 illustrates in section a modified form of apparatus in which the lineally extended member of the magnetic portion thereof is the pole of the magnet.

Fig. 9 is a front elevation of the same.

Fig. 10 is a side elevation in which the lineally extended member is the pole of an electro-magnet and Fig. 11 is a plan of the same.

In Fig. 1 the two magnetic and mutually magnetized elements comprise respectively a permanent or electro-magnet 1 and an armature 2. The poles 3 of said magnet are preferably arranged to embrace the armature 2 between them and it is also desirable to use a pointed pole and to correspondingly shape or bevel the armature or edges thereof presented to said poles, as this will aid in giving a more definite motion and position to the armature and the parts carried by it in the operation of the apparatus. The magnet in the form of the invention shown in Fig. 1 is properly supported on the guide 4 or in any other suitable manner, so that motion in a right line in the direction of the arrow 5 may be imparted to the poles 3. The armature 2 is properly mounted upon a shaft 6 adapted to turn on a proper support 7. The latter may be fixed, or may, like the armature 1, be capable of movement in a line such as to move the armature with respect to the poles and in a direction to tend to increase the magnetic reluctance of the magnetic circuit by moving the armature out of the position where the reluctance will be at a minimum. For this purpose the support 7 may be also mounted on a suitable guide 8. The armature 2 is preferably supported directly in the disk or other support 9 of non-metallic material.

In the form of the invention shown in Fig. 1 the armature 2 is lineally extended in the path which, generally stated, is a spiral described around the axis of rotation of shaft 6, by which it is supported and so that said axis will, in all positions of the armature, describe a path which will be inclined to the path of movement of the pole pieces 3 or, conversely stated, the direction of movement of the poles 1 when moved in the direction of the arrow 5 will be, in all positions of the armature 2, inclined to the curved axis of the part 2 instead of being normal to said curve. At the same time the armature 2 being lineally extended, as shown, is free to move by the magnetic action through an extended range of motion which it is caused to make by the magnetic forces set up when the magnet poles are moved in the direction of the arrow in relation to the armature, or vice versa, which movement will result in an increase of the magnetic reluctance and a magnetic effort tending to reëstablish the reluctance at a minimum with a consequent turning moment, causing the whole armature to turn around the axis of shaft 6.

With the construction or form of curve of armature 2, shown in Fig. 1, a rectilinear movement of the magnet 1 or the pole pieces thereof in the direction of the arrow 5 through a distance from 10 to 10' will produce approximately a whole rotation of the shaft 6 and a reverse movement of said magnet will produce a counter rotation of said shaft through a whole revolution. This action results from the fact that the movement inward of the magnet with its poles transversely across the turn of the spiral armature tends to produce an increase of the magnetic reluctance of the whole magnetic circuit comprising the magnet and armature and the effort of the magnetic forces to reëstablish the magnetic reluctance at a minimum causes the armature to move in a general direction through a space between the pole pieces, with the consequence that a mechanical turning movement is produced on the shaft 6. Plainly, the magnet 1 might be fixed on its support and the part 7 carrying the armature might be caused to move on the guides 8 for the purpose of converting the rectilinear movement of the part 7 by a sidewise movement of the shaft 6 into a movement of rotation of said shaft in the same manner by disturbing the magnetic relation of the parts mutually magnetized in the magnetic circuit through the mechanical action of the part whose motion is to be translated or transformed.

The pitch of the spiral or the curve thereof, or in other words, the inclination of the curve to the line of movement mechanically produced by the part whose motion is to be translated, obviously will determine the relative rate of the transformation or ratio of conversion of movement. With a wider spiral or spiral of larger pitch it is plain that a greater motion of the magnetic elements with respect to one another under the mechanical forces to be translated, will be required. This principle is clearly illustrated in Fig. 3, in which the armature 2 is represented as having a linear axis or axis of extension describing a straight line and it is assumed that the direction of movement of said armature as a whole is a right line in the direction of the arrow 12, said armature being for that purpose properly mounted and guided on a suitable support. If the magnet 1 has a motion at right angles to the arrow 12, or in the direction of the arrow 13, it is plain that the armature 2, being embraced between the poles of the magnet 1 in the manner shown in Fig. 1, will be caused to move in a right line in the direction of the arrow 12 when the armature is moved and guided in the direction of the arrow 13, and it is also plain that the degree of inclination of the linear axis of the extended armature 2 will determine its rate of movement for any given movement of the magnet 1. It is also evident that if said armature has a linear axis describing a curve as shown in Fig. 4, the motion of the armature 2 or the part upon which it is supported, instead of being uniform through the whole phase or range of movement of the armature, will vary, and that the ratio of movement may be varied at will and also may be varied through any portion of the phase of movement mechanically impressed upon the part 1 for the purpose of converting its motion into motion of a part sustained or carried by the armature 2 and properly guided. It is evident that this is also true of the apparatus shown in Fig. 1.

In the modification of our invention shown in Fig. 5, the magnet is mounted so that its poles will describe an arc of revolution and in so doing will cause a movement of rotation of the axis upon which the armature 2 is supported. By this construction a rocking movement mechanically impressed upon one part may be converted into a movement of rotation or a rocking movement of another part. In this action it is presupposed that the support 7 for the shaft 6 is fixed.

Fig. 6 shows the spiral of the armature repeated in a number of spiral turns with the obvious effect that by moving the magnet in a line from the point 14 to the point 14', three whole revolutions of the shaft 6 may be produced.

In the modification shown in Fig. 7 the armature 2 describes a helix and is mounted upon a suitable frame carried by the shaft 6, the latter being mounted in turn, and carried by a proper support 7'. The magnet 1 is properly mounted and secured in the guided block or support 15. By moving the magnet 1 or the support 15 therefor by any means in a direction across the turn of the helix or so as to tend to increase the magnetic reluctance, a turning movement will be given to the shaft 6 through the effort of the magnetic lines to establish a condition of minimum magnetic reluctance, this action taking place by reason of the fact that although the armature 2 or turns thereof may rotate through the space between the poles of the magnet, there is an inclination of the axis of the lineal extension of said armature to the direction of movement impressed mechanically upon the magnet, which inclination corresponds to the pitch of the helix. The degree of this inclination or, in other words, the pitch of the helix, will determine the rate of conversion of the motion mechanically imparted to the portion 15 carrying said armature, into the movement of rotation of the shaft 6. It is plain that a similar conversion of motion into rotation of shaft 6 might be produced by imparting motion mechanically to the frame 7' in the direction of the double arrow 16, the magnet 2 in such instance being fixed.

Referring to Fig. 8, the magnetic element which is lineally extended and on a line inclined to the motion mechanically impressed and converted, is a magnet pole instead of the armature. In this form of our invention the magnet 18 is a box or cup-shape having a polar condition illustrated by the signs plus and minus, and the armature indicated at 19 has polar projections 20 which are presented to the edges of a helix 21 cut in one pole of the magnet. Armature 19 is mounted on a shaft 22 forming one mechanical element and the magnet 18 may be mounted on a suitable guide 23. The helical turns 21 of the pole answer in this instance and in principle of operation to the spiral or curved form of the armature in the previous instances, and the turns of the helix 21 describe a path which is inclined to the direction of motion of the magnet 18 if moved on its support by mechanical means in the direction of the arrow 24, or to the direction of movement axially of the shaft 22, around whose axis the spiral 21 is described. Assuming that the shaft 22 carrying the magnetic element 20 is properly mounted and supported in bearings, a rectilinear or similar movement of the magnet 18 in the direction of the arrow 24 and so as to disturb the magnetic conditions and tend to increase the magnetic reluctance by a relative motion of the edges of the spiral transversely to the points of the armature, will cause a rotation of the shaft 22. Or, in a similar way, the magnet 18 being fixed and an axial motion of translation of the shaft 22 being impressed upon said shaft, said motion will be transformed into a movement of rotation of said shaft in substantially the same way.

In the further modification of our invention illustrated in Figs. 10 and 11, the magnet 18' is an electro-magnet mounted on a suitable shaft 6 and has its polar portion lineally extended to describe a curved line passing through the space between the poles of a part 25 constituting in effect an armature therefor. Mechanical movement imparted to the armature 25 in this instance in a right line in the direction of the arrow 26 will result in a rotation of the shaft 6 carrying the magnet, the rate of movement being determined by the degree of inclination of the curve to the line of movement of the armature and the direction of the curve determining the direction of rotation of the shaft. In the instance shown a movement of rotation of the shaft 6 will be produced in a counter-clockwise movement by motion imparted to the armature until the same reaches the point 27, after which a continuance of the motion of the armature along the same line and in the same direction will produce a reversal of movement of the shaft or, in other words, cause it to describe a movement clockwise. Plainly, the movement of the shaft 6 bodily by motion imparted to the bearing for the shaft will cause an oscillation of said shaft, if the motion impressed be in a direction opposite to that of the arrow 26, and at such time the magnetic element 25 be fixed.

What we claim as our invention is:—

1. A magneto mechanical movement whose magnetic portion consists essentially of two magnetic and mutually magnetized elements or members adapted by a mutual magnetic action to assume a series of positions in which the magnetic reluctance of the magnetic circuit including them will be at its minimum due to the direct apposition of said members and with a substantially uniform pole face relation at all of said positions, one of said elements being lineally extended as described in a direction inclined to the direction of motion mechanically produced by the action of a part whose motion is to be translated or transformed and operating independently of the magnetism involving said elements.

2. A magneto mechanical movement whose magnetic portion consists essentially of two elements, namely a magnet and an armature adapted by their mutual magnetic action to assume a series of positions in which they will be in direct apposition and consequent equilibrium due to the condition of minimum magnetic reluctance thereby established and with a substantially uniform magnetic relation at all of said positions, one of said elements being lineally extended as described in a direction inclined to the direction of motion mechanically produced by the action of a part whose motion is to be translated or transformed, said part acting independently of the magnetic forces tending to place the elements in the position of minimum reluctance.

3. A magneto-mechanical movement whose magnetic portion comprises essentially two elements or members consisting respectively of a magnet having a pointed pole piece and an armature lineally extended on a line passing through the magnetic field of said pole piece but inclined to the direction of movement impressed upon an element of said magnetic portion by the mechanical action of the part whose motion is to be translated or transformed, one of said elements being freely movable so as to, by their mutual action, bring the pole piece and armature into direct apposition and thereby establish a condition of minimum magnetic reluctance and stable equilibrium when moved away from such position of apposition by the action of a force operating against the magnetic moment.

4. A magneto mechanical movement comprising essentially a magnetic portion consisting of two elements, namely an armature and a pole piece free to move by their magnetic action to assume with relation to one another a series of positions in which the magnetic reluctance and polar relation of the parts to one another will be the same for all positions, and also movable with respect to one another in either direction by external means operating independently of the magnetic forces of the magnetic circuit in which the armature and pole piece are included and in a direction tending to increase the reluctance, one of said elements being lineally extended and having its axis or line of extension inclined to the direction of the motion of a magnetic element of the apparatus when caused to move mechanically by said external means.

5. A magneto-mechanical movement comprising in combination two elements, viz. an armature and a pair of pole pieces embracing the same, said elements being in stable equilibrium and the magnetic circuit including them being of minimum magnetic reluctance when they are in direct apposition and said elements being mechanically movable with relation to one another by external means operating independently of the magnetic forces tending to draw the elements into position of minimum magnetic reluctance and in a direction to increase the magnetic reluctance of the magnetic circuit of said pole pieces, one of said elements being lineally extended to extend the range of the magnetic action, and the direction of said extension being inclined to the direction of movement of the element upon which the motion to be converted or transmitted is impressed.

6. The combination in a motion translating device, of an armature mounted on a shaft and lineally extended to describe a curve of changing radius around said shaft, combined with a magnetic pole piece presented to said armature, said armature and magnet being movable by mechanical means with relation to one another and in a direction transverse to the longitudinal axis of the armature as and for the purpose described.

7. In a motion translating device, the combination substantially as described, of a pointed magnetic pole piece, a knife-edge armature lineally extended in a line passing through the field of said pole piece, said armature and magnet being mounted so as to be capable of movement with relation to one another to assume a position of stable magnetic equilibrium due to the production of a magnetic circuit whose reluctance is a minimum due to the passage of the lines of force directly across the space between the point and knife edge when they are in direct apposition and also capable of movement with reference to one another by the mechanical action of the part whose motion is to be translated or changed and operating in either direction against the influence of the magnetic forces of the circuit including them and said armature having the direction of its extension inclined to the direction of the motion impressed upon the device by the mechanical action.

8. In a magneto-mechanical movement, the combination of a pair of pole pieces constituting one element and an armature constituting another element and lineally extended in a line passing through the space between said pole pieces, said elements being adapted to assume a position of stable magnetic equilibrium by the production of a magnetic circuit whose reluctance is a minimum due to the passage of the lines of magnetic force in a direct line through the pole pieces and armature when they are in apposition, one of said elements being mounted to permit the shifting of the armature mechanically by means acting in either direction against the influence of the magnetic forces of the circuit including said pole pieces and armature to increase the magnetic reluctance and the direction of the line of extension of said armature being inclined to the direction of the shifting movement.

9. In a magneto-mechanical movement, the combination of a magnet and an armature, one of said members being lineally extended in a line passing through a space embraced in the magnetic circuit of the other, said members being mounted to permit a shifting of the one member with respect to the other by mechanical means by means acting in either direction against the influence of the magnetic forces of the circuit including said pole pieces and armature to increase the magnetic reluctance and the direction of extension of said lineally extended member being inclined to the direction of the shifting movement.

10. The combination substantially as described of a spiral armature mounted on a shaft coinciding substantially with the center of the spiral, said spiral widening outwardly from the axis of said shaft as a center and a magnet mounted so as to permit it to be moved in a direction across the turn of said spiral to produce rotation of the shaft.

11. The combination substantially as described, of a spiral armature mounted on a shaft coinciding substantially with the center of the spiral, and a pair of pole-pieces embracing said armature, said magnet members being mounted so as to permit their position with relation to one another by movement in a plane transverse to the axis of said spiral to be changed to produce rotation of said shaft.

12. The combination substantially as described, of an armature mounted on an axis and lineally extended in a plane transverse to said axis, and a pair of pole-pieces embracing said armature, said armature and pole-pieces being mounted to permit their position with relation to one another by movement transverse to said axis to be changed by mechanical means and by movement on a line inclined to the direction of the extension of the armature.

13. A magneto-mechanical movement comprising as its essential motion translating device two elements composed respectively of an armature and means for producing a magnetic field for said armature, one of said elements being lineally extended into a number of spiral turns, said elements being mounted to permit a mechanical motion of bodily translation of one part with respect to the other across the turns of the spiral as and for the purpose described.

14. A magneto mechanical motion translating device, the motion modifying element of which consists essentially of two magnetic mutually magnetized members mechanically mounted to permit a relative movement of them with relation to one another to be impressed upon them, in either direction and against the influence of the magnetic circuit including them such as to cause a change in the magnetic reluctance and capable of movement with relation to one another under the magnetic influence to restore the minimum magnetic reluctance, one of said members being lineally extended in a direction predetermined by the rate of modification of movement required and the polar relation and magnetic reluctance at all points in the resultant line of points of intersection of the lines of motion of the two members being the same for all positions of rest, whereby on impressing an extraneous force mechanically or otherwise upon either member in any position thereof producing motion thereof in a direction to force a change of magnetic reluctance, a motion of the members with relation to one another under the magnetic influence will result, causing them to assume a new position of minimum magnetic reluctance predetermined by the direction of the line of extension.

Signed at New York in the county of New York and State of New York this 8th day of January A. D. 1914.

JAMES M. BOYLE.
FRITZ REICHMANN.

Witnesses:
F. B. TOWNSEND,
HENRY A. GENS.